(12) United States Patent
Kawasaki et al.

(10) Patent No.: US 10,086,593 B2
(45) Date of Patent: Oct. 2, 2018

(54) LAMINATE BODY, CROSS-LINKED PRODUCT, AND MOLDED MEMBER

(75) Inventors: Takashi Kawasaki, Ichihara (JP); Shogo Hagiwara, Itoigawa (JP); Toshiaki Miyauchi, Itoigawa (JP)

(73) Assignee: DENKA COMPANY LIMITED, Tokyo (JP)

( * ) Notice: Subject to any disclaimer, the term of this patent is extended or adjusted under 35 U.S.C. 154(b) by 328 days.

(21) Appl. No.: 14/347,151

(22) PCT Filed: Aug. 29, 2012

(86) PCT No.: PCT/JP2012/071812
§ 371 (c)(1),
(2), (4) Date: Mar. 25, 2014

(87) PCT Pub. No.: WO2013/047058
PCT Pub. Date: Apr. 4, 2013

(65) Prior Publication Data
US 2014/0227471 A1 Aug. 14, 2014

(30) Foreign Application Priority Data

Sep. 26, 2011 (JP) .................................. 2011-209248

(51) Int. Cl.
*B32B 27/30* (2006.01)
*B32B 25/04* (2006.01)
(Continued)

(52) U.S. Cl.
CPC .............. *B32B 27/308* (2013.01); *B32B 1/08* (2013.01); *B32B 25/042* (2013.01); *B32B 25/14* (2013.01);
(Continued)

(58) Field of Classification Search
CPC ....... B32B 27/28; B32B 27/30; B32B 27/308; B32B 27/322; F16L 11/04; Y10T 428/1393; Y10T 428/3154; Y10T 428/31855
See application file for complete search history.

(56) References Cited

U.S. PATENT DOCUMENTS

| 4,606,952 A | 8/1986 | Sugimoto et al. ............... 428/36 |
| 4,975,139 A * | 12/1990 | Sugimoto ................ C08K 5/50 |
| | | 156/244.13 |

(Continued)

FOREIGN PATENT DOCUMENTS

| JP | 59-70562 A | 4/1984 |
| JP | 3-67637 A | 3/1991 |

(Continued)

OTHER PUBLICATIONS

International Search Report dated Oct. 30, 2012, issued in corresponding International Application No. PCT/JP2012/071812.
(Continued)

*Primary Examiner* — Walter Aughenbaugh
(74) *Attorney, Agent, or Firm* — Stein IP, LLC

(57) ABSTRACT

Provided are a laminate body, a cross-linked product, and a molded member superior in interlayer adhesiveness. An acrylic elastomer layer 11 is prepared from an acrylic elastomer composition containing an epoxy group-containing acrylic elastomer as major component, an onium salt in an amount of 1 to 5 parts by mass and a polyol compound in an amount of 1 to 8 parts by mass with respect to 100 parts by mass of the acrylic elastomer, and a fluorine-based elastomer layer 12 is prepared from a fluorine-based elastomer composition containing a polyol crosslinking agent. The acrylic elastomer layer 11 and the fluorine-based elastomer layer 12 are laminated, to give a laminate body 1. The
(Continued)

laminate body 1 is cross-linked, to give a cross-linked product or a molded member.

8 Claims, 1 Drawing Sheet

(51) Int. Cl.

| | |
|---|---|
| *B32B 25/14* | (2006.01) |
| *B32B 27/08* | (2006.01) |
| *B32B 27/32* | (2006.01) |
| *B32B 1/08* | (2006.01) |
| *F16L 11/04* | (2006.01) |
| *C08L 33/06* | (2006.01) |

(52) U.S. Cl.
CPC ............ *B32B 27/08* (2013.01); *B32B 27/322* (2013.01); *C08L 33/068* (2013.01); *F16L 11/04* (2013.01); *B32B 2250/02* (2013.01); *B32B 2250/24* (2013.01); *B32B 2250/248* (2013.01); *B32B 2307/306* (2013.01); *B32B 2307/56* (2013.01); *B32B 2581/00* (2013.01); *B32B 2597/00* (2013.01); *B32B 2605/08* (2013.01); *C08L 2203/16* (2013.01); *C08L 2312/00* (2013.01); *Y10T 428/1352* (2015.01); *Y10T 428/1386* (2015.01); *Y10T 428/1393* (2015.01); *Y10T 428/3154* (2015.04)

(56) References Cited

U.S. PATENT DOCUMENTS

| | | | |
|---|---|---|---|
| 5,508,355 A * | 4/1996 | Toda | C08K 5/0025 525/326.3 |
| 6,380,318 B1 * | 4/2002 | Saito | C08F 8/00 525/282 |
| 9,227,380 B2 * | 1/2016 | Kawasaki | B32B 25/042 |
| 2005/0000582 A1 | 1/2005 | Okado et al. | 138/137 |

FOREIGN PATENT DOCUMENTS

| | | |
|---|---|---|
| JP | 2002-059486 A | 2/2002 |
| JP | 2004-150457 A | 5/2004 |
| JP | 2009-234216 A | 10/2009 |
| JP | 2010-42669 A | 2/2010 |
| JP | 2010-253728 A | 11/2010 |
| JP | 2011-116004 A | 6/2011 |
| JP | 5273048 B2 | 8/2013 |
| WO | WO 2008/139967 A1 | 11/2008 |
| WO | WO 2009/020182 A1 | 2/2009 |

OTHER PUBLICATIONS

Chinese Office Action dated Mar. 30, 2015, issued to Chinese Application No. 201280046917.4.

* cited by examiner

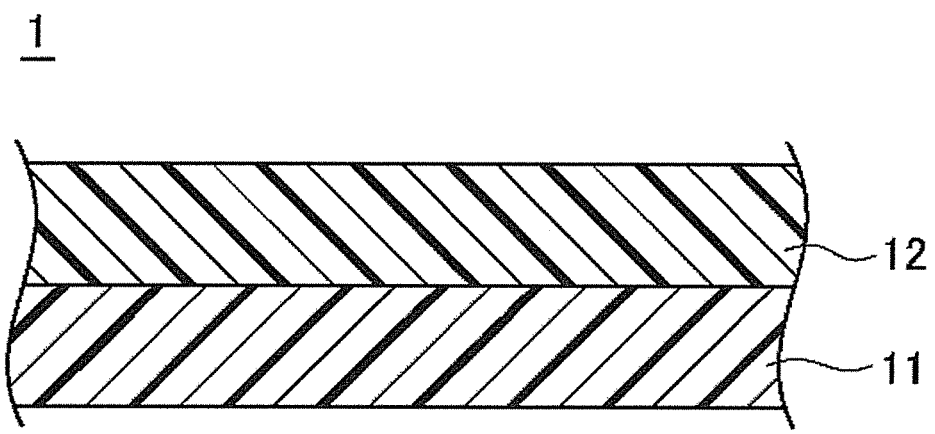

LAMINATE BODY, CROSS-LINKED PRODUCT, AND MOLDED MEMBER

CROSS-REFERENCE TO RELATED APPLICATIONS

This application is a national phase of International Application No. PCT/JP2012/071812, filed Aug. 29, 2012, which claims the benefit of Japanese Application No. 2011-209248, filed Sep. 26, 2011, in the Japanese Patent Office. All disclosures of the document(s) named above are incorporated herein by reference.

BACKGROUND OF THE INVENTION

1. Field of the Invention

The present invention relates to a laminate body, a cross-linked product, and a molded member of elastomers. More specifically, it relates to a laminate body, a cross-linked product, and a molded member made of an acrylic elastomer and a fluorine-based elastomer.

2. Description of the Related Art

Acrylic elastomers and the cross-linked products thereof, which are superior in physical properties such as heat aging resistance, oil resistance, mechanical properties and compression set properties, have been widely used as materials used in automobile engine rooms such as hose members, seal members, and antivibration rubber members. Under the influence of increasing regulations on exhaust gas and increase of engine power, there is recently a demand for materials superior in heat aging resistance that can be used as such automobile members.

As a means for improving the heat aging resistance and thus for increasing the reliability of rubber parts, it may be effective for example to use a fluorine-based elastomer that is higher in durability than acrylic elastomers. However, because fluorine-based elastomers are lower in low-temperature resistance and more expensive than acrylic elastomers, it is needed to solve the problems above in order to apply them to materials for auto parts that demand low cost and high reliability simultaneously.

Thus, methods of using a fluorine-based elastomer in combination with another elastomer were proposed. It is possible to reduce the increase in material costs as much as possible and yet increase the durability substantially, for example, by forming only regions that may cause problems particularly in durability with a fluorine-based elastomer and the other regions with a conventional material.

An important requisite in properties when a laminate body is formed with multiple materials is the adhesiveness between layers of different materials. Low interlayer adhesion strength leads to decrease of reliability as a laminate body. In particular, because fluorine-based elastomers are less adhesive to other materials, it is quite important to improve the adhesion strength between the fluorine-based elastomer and the acrylic elastomer, to obtain a laminate body superior in durability cost-effectively.

Examples of the methods for improving the adhesiveness of fluorine-based elastomers include methods of treating the surface of a fluorine-based elastomer layer, with metal sodium solution (see, for example, Patent Document 1), by discharge treatment (see, for example, Patent Document 2), by plasma treatment (see, for example, Patent Document 3) and the like. Also proposed were laminate bodies that are improved in physical properties such as low-temperature embrittlement resistance and also in adhesiveness to non-fluorine rubber layers by blending a fluoroplastic resin having a particular structure to the fluorine rubber (see Patent Documents 4 and 5).

Patent Document 4 discloses that it is possible to improve the adhesiveness of a fluorine-based rubber to a non-fluorine-based rubber by using a polyol-based crosslinking agent for crosslinking the fluorine-based rubber or by adding an onium salt or an amine compound to the fluorine-based rubber. There is also reported a laminate body with the adhesiveness between the fluorine polymer layer and the non-fluorine rubber layer improved by addition of an adhesive compounding agent in a particular structure to the non-fluorine rubber layer (see Patent Document 6).

CITATION LIST

Patent Literatures

[Patent Document 1] JP-A No. H03-67637
[Patent Document 2] JP-A No. 2002-59486
[Patent Document 3] JP-A No. 2009-234216
[Patent Document 4] JP-A No. 2010-42669
[Patent Document 5] WO No. 2009/020182
[Patent Document 6] JP-A No. 2011-116004

SUMMARY OF THE INVENTION

Technical Problem

However, the prior art described above has the following problems: Specifically, the surface treatments, such as those described in Patent Documents 1 to 3, make the production process complicated and lead to increase of the production cost for laminate bodies such as hose products. In addition, such surface treatment, if conducted, causes a concern about degradation of the elastomer layer and deterioration of the sealing efficiency of the laminate body.

Further, the methods described in Patent Documents 4 to 6 demand an additional step of melting the fluorine rubber and the fluoroplastic resin at high temperature previously before conversion to the laminate body, causing a problem of complication of the production process. Furthermore in the method described in Patent Document 6, an adhesive compounding agent is added to the non-fluorine rubber layer. It is needed to add 8-benzyl-1,8-diazabicyclo[5,4,0]-7-undecenium chloride, an epoxy resin, or the like for improvement of its effectiveness, which causes a problem that the kinds and amounts of the chemicals added should be increased.

Accordingly, an object of the present invention is to provide a laminate body, a cross-linked product, and a molded member superior in interlayer adhesiveness.

Solution to Problem

The laminate body according to the present invention is a laminate body, at least comprising an acrylic elastomer layer prepared from an acrylic elastomer composition containing an epoxy group-containing acrylic elastomer as major component, an onium salt in an amount of 1 to 5 parts by mass and a polyol compound in an amount of 1 to 8 parts by mass with respect to 100 parts by mass of the acrylic elastomer and a fluorine-based elastomer layer prepared from a fluorine-based elastomer composition containing a polyol crosslinking agent.

The onium salt in the laminate body may be an organic ammonium salt and/or an organic phosphonium salt.

The polyol compound for use may be a polyhydroxyaromatic compound.

The cross-linked product according to the present invention is a product obtained by crosslinking the laminate body described above.

The molded member according to the present invention is a product prepared form the laminate body or the cross-linked product described above and is used, for example, as a hose, a seal part or an antivibration rubber part.

Advantageous Effects of Invention

It is possible according to the present invention to obtain a laminate body, a cross-linked product, and a molded member superior in interlayer adhesiveness, as the fluorine-based elastomer and the acrylic elastomer are bonded by co-crosslinking.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 1 is a sectional view illustrating the exemplary configuration of a laminate body in the first embodiment of the present invention.

DETAILED DESCRIPTION OF THE EMBODIMENTS

Hereinafter, favorable embodiments of the invention will be described in detail. However, it should be understood that the present invention is not restricted by the embodiments below.

First Embodiment

First, a laminate body in the first embodiment of the present invention will be described. FIG. 1 is a cross-sectional view illustrating the configuration of the laminate body in the present embodiment. As shown in FIG. 1, the laminate body 1 of the present embodiment has an acrylic elastomer layer 11 and a fluorine-based elastomer layer 12 laminated to each other.

Although FIG. 1 shows a laminate body having an acrylic elastomer layer 11 and a fluorine-based elastomer layer 12 laminated to each other, the present invention is not limited to the configuration and the laminate body 1 may have one or more acrylic elastomer layers 11 and one or more fluorine-based elastomer layers 12 laminated to each other. In such a case, the acrylic elastomer layers 11 and the fluorine-based elastomer layers 12 are laminated alternately.

The laminate body 1 in the present embodiment may have one or more layers in addition to the acrylic elastomer layer 11 and the fluorine-based elastomer layer 12. For example, it may have a structure having reinforcement fibers deposited thereon. In such a case, the reinforcement fibers are bonded tightly to one or both of the acrylic elastomer layer 11 and the fluorine-based elastomer layer 12.

[Acrylic Elastomer Layer 11]

The acrylic elastomer layer 11 is obtained by molding an acrylic elastomer composition containing at least an epoxy group-containing acrylic elastomer, an onium salt, and a polyol compound into a layer or film shape. The "acrylic elastomer composition" means that 50 mass % or more of the elastomers blended therein is an acrylic elastomer. Examples of the elastomers blended with the acrylic elastomer include hydrin rubbers, nitrile rubbers, hydrogenated nitrile rubbers, chloroprene rubbers, ethylene-propylene rubbers, silicone rubbers, chlorosulfonated polyethylene rubbers, and the like.

<Acrylic Elastomer>

The epoxy group-containing acrylic elastomer, which is the major component in the acrylic elastomer composition for the acrylic elastomer layer 11, is a copolymer of an alkyl (meth)acrylate ester and an epoxy group-containing cross-linking monomer. The "crosslinking monomer" is a monomer having a functional group providing a crosslinking site (crosslinking point). The epoxy group-containing acrylic elastomer may contain, as needed, vinyl acetate, a cross-linking monomer having a functional group other than epoxy group or ethylene, as it is copolymerized.

The alkyl (meth)acrylate ester is a component forming the skeleton of the acrylic elastomer and it is possible by proper selection of the kind thereof to modify the basic properties, such as physical properties under ambient atmosphere, low-temperature resistance, and oil resistance, of the acrylic elastomer composition obtained. The "alkyl (meth)acrylate esters," which is a synonym for (meth)acrylates, include both alkyl methacrylate esters (methacrylates) and alkyl acrylate esters (acrylates).

Typical examples of the alkyl methacrylate esters include methyl (meth)acrylate, ethyl (meth)acrylate, n-propyl (meth)acrylate, n-butyl (meth)acrylate, isobutyl (meth)acrylate, n-pentyl (meth)acrylate, isoamyl (meth)acrylate, n-hexyl (meth)acrylate, 2-methylpentyl (meth)acrylate, n-octyl (meth)acrylate, 2-ethylhexyl (meth)acrylate, n-decyl (meth)acrylate, n-dodecyl (meth)acrylate, n-octadecyl (meth)acrylate, and the like.

Examples of the alkyl acrylate esters include 2-methoxyethyl acrylate, 2-ethoxyethyl acrylate, 2-(n-propoxy)ethyl acrylate, 2-(n-butoxy)ethyl acrylate, 3-methoxypropyl acrylate, 3-ethoxypropyl acrylate, 2-(n-propoxy)propyl acrylate, 2-(n-butoxy)propyl acrylate, and the like.

The alkyl (meth)acrylate esters for the epoxy group-containing acrylic elastomer are not limited to the alkyl methacrylate esters and the alkoxyalkyl acrylate esters described above. These alkyl (meth)acrylate esters may be used alone or in combination of two or more.

It is possible by regulating the blending amount of these unsaturated monomers during copolymerization to adjust the low-temperature resistance and the oil resistance of the acrylic elastomer composition obtained and the cross-linked product thereof. For example when the acrylic elastomer is prepared from ethyl acrylate and n-butyl acrylate, it is possible to improve the low-temperature resistance by raising the copolymerization ratio of n-butyl acrylate and the oil resistance by raising the copolymerization ratio of ethyl acrylate.

On the other hand, the crosslinking monomer is copolymerized with the alkyl (meth)acrylate ester for regulation of the hardness and the elongation properties of the acrylic elastomer obtained by acceleration of intermolecular cross-link. In the present embodiment, the acrylic elastomer composition should contain an epoxy group-containing crosslinking monomer and it is possible, if needed, to use other crosslinking monomers, such as those having active chlorine groups and carboxyl groups, in combination.

Examples of the epoxy group-containing crosslinking monomers include glycidyl acrylate, glycidyl methacrylate, allyl glycidyl ether, methallyl glycidyl ether, and the like. It becomes possible, by introducing epoxy groups into an acrylic elastomer by copolymerization of these epoxy group-containing crosslinking monomer, to crosslink a fluorine-based elastomer with the acrylic elastomer.

Examples of the other crosslinking monomers include active chlorine group-containing monomers such as 2-chloroethyl vinyl ether, 2-chloroethyl acrylate, vinylbenzyl chloride, vinyl chloroacetate, and allyl chloroacetate; and carboxyl group-containing monomers such as acrylic acid, methacrylic acid, crotonic acid, 2-pentenoic acid, maleic acid, fumaric acid, itaconic acid, monoalkyl maleate esters, monoalkyl fumarate esters, monocyclohexyl maleate, monocyclohexyl fumarate, and cinnamic acid.

Acrylic elastomers readily lose their mechanical properties such as tensile strength and breaking elongation rapidly by cleavage of the main chain for example under the influence of heat or ultraviolet ray. Alternatively, vinyl acetate readily causes crosslinking reaction and it is possible by proper regulation of the blending amount to adjust the degree of intermolecular crosslinking of the acrylic elastomer obtained. Because, even when the main chain of the acrylic elastomer is cleaved by heat aging, vinyl acetate can crosslink the cleaved molecules to each other once again as it provides a crosslinking site, it is possible, by copolymerization of vinyl acetate as other crosslinking monomer into the main chain of the acrylic elastomer, to preserve the mechanical properties, such as elongation, of the acrylic elastomer.

The acrylic elastomer used in the laminate body 1 in the present embodiment is obtained by copolymerization of the monomers described above by a known method such as emulsion polymerization, suspension polymerization, solution polymerization, or bulk polymerization. The amount of the crosslinking monomers blended then is preferably 0.5 to 10 mass %, more preferably 1 to 5 mass %, and particularly preferably 1 to 4 mass %, with respect to the total amount of the monomers constituting the acrylic elastomer. The "amount of the crosslinking monomers blended" is the total amount of the crosslinking monomers blended. For example when an epoxy group-containing crosslinking monomer is used alone, it is the blending amount of it. When an epoxy group-containing crosslinking monomer and other crosslinking monomers are used in combination, it is the total amount of these monomers.

When the blending amount of the crosslinking monomers is less than 0.5 mass % with respect to the total amount of the monomers constituting the acrylic elastomer, it may not be possible to obtain sufficient crosslinking efficiency when the laminate body is cross-linked, leading to insufficient strength of the cross-linked product. Alternatively when the blending amount of the crosslinking monomers is more than 10 mass %, the cross-linked product may have excessively high hardness and lose its rubber elasticity.

When vinyl acetate is copolymerized, the blending amount thereof is preferably not more than 20 mass % with respect to the total amount of the monomers constituting the acrylic elastomer. When the copolymerization rate of vinyl acetate is in the range above, it is possible to preserve the heat aging resistance of the acrylic elastomer and yet reduce decline of the mechanical properties.

The acrylic elastomer used in the laminate body 1 in the present embodiment may be copolymerized with other monomers copolymerizable with the monomers described above in the range that does not impair the object of the present invention. Examples of the other monomers copolymerizable with the acrylic elastomer include, but are not particularly limited to, alkyl vinyl ketones such as methyl vinyl ketone; vinyl and allyl ethers such as vinyl ethyl ether and allyl methyl ether; vinyl aromatic compounds such as styrene, α-methylstyrene, chlorostyrene, vinyltoluene, and vinylnaphthalene; vinyl nitriles such as acrylonitrile and methacrylonitrile; and ethylenic unsaturated compounds such as acrylamide, propylene, butadiene, isoprene, pentadiene, vinyl chloride, vinylidene chloride, vinyl fluoride, vinylidene fluoride, ethylene, and vinyl propionate.

In particular among the monomers above, ethylene is effective in drastically improving the strength of the acrylic elastomer when copolymerized. However, for preparation of a product with unreduced rubber elasticity and favorable low-temperature properties, the amount of ethylene blended is desirably not more than 50 mass % with respect to the total amount of the monomers constituting the acrylic elastomer.

<Onium Salt>

The acrylic elastomer composition for preparation of acrylic elastomer layer 11 contains an onium salt in an amount of 1 to 5 parts by mass with respect to 100 parts by mass of the major-component acrylic elastomer. As described above, it becomes possible by adding an onium salt to the acrylic elastomer composition to co-crosslink a fluorine-based elastomer with the acrylic elastomer.

However when the content of the onium salt is less than 1 part by mass with respect to 100 parts by mass of the acrylic elastomer, the acrylic elastomer layer 11 becomes less adhesive, leading to separation of the layer from the fluorine-based elastomer layer 12. Alternatively when the content of the onium salt is more than 5 parts by mass with respect to 100 parts by mass of the acrylic elastomer, the acrylic elastomer layer 11 becomes less processable. The content of the onium salt in the acrylic elastomer composition is preferably 2 to 5 parts by mass with respect to 100 parts by mass of the acrylic elastomer and then, the acrylic elastomer layer 11 has further improved adhesion strength and processability.

The onium salt added to the acrylic elastomer composition is not particularly limited and examples thereof include organic ammonium salts, organic phosphonium salts, and the like. Typical examples of the organic ammonium salts include tetra-n-butylammonium chloride, trimethylphenylammonium chloride, trimethylstearylammonium chloride, trimethyllaurylammonium chloride, trimethylcetylammonium chloride, dimethyldistearylammonium chloride, tributylbenzylammonium chloride, tetra-n-butylammonium bromide, methyltriphenylammonium bromide, ethyltriphenylammonium bromide, trimethylphenylammonium bromide, trimethylbenzylammonium bromide, stearyltrimethylammonium bromide, tetrabutylammonium thiocyanate, and the like.

Examples of the organic phosphonium salts include tetra-n-butylphosphonium chloride, tetra-n-butylphosphonium bromide, methyltriphenylphosphonium bromide, ethyltriphenylphosphonium bromide, butyltriphenylphosphonium bromide, hexyltriphenylphosphonium bromide, benzyltriphenylphosphonium bromide, tetraphenylphosphonium chloride, tetraphenylphosphonium bromide, 4-butoxybenzyltriphenylphosphonium bromide, allyltributylphosphonium chloride, 2-propynyltriphenylphosphonium bromide, methoxypropyltributylphosphonium chloride, and the like. These onium salts, such as organic ammonium salts and organic phosphonium salts, can be used alone or in combination of two or more.

In the method described in Patent Document 4 described above, an onium salt is added to a fluorine-based elastomer and, in this case, the onium salt should be added to fluorine resins and rubbers, after they are blended previously at high temperature and as the blend is cooled. In contrast in the case of the laminate body 1 of the present embodiment, an onium salt is added to the acrylic elastomer and thus there is no need for the prior kneading at high temperature. Therefore, the production process for the laminate body 1 in the present embodiment can be simplified, compared to the process by the conventional method described in Patent Document 4.

<Polyol Compound>

The acrylic elastomer composition for preparation of acrylic elastomer layer 11 contains additionally a polyol compound blended thereto in an amount of 1 to 8 parts by mass with respect to 100 parts by mass of the acrylic elastomer. It is possible to improve the processing stability of the acrylic elastomer layer 11 by blending a polyol compound in an amount in the range above.

However when the content of the polyol compound is less than 1 part by mass with respect to 100 parts by mass of the acrylic elastomer, the effectiveness of improvement in the Mooney scorch stability of the acrylic elastomer composition becomes insufficient. Alternatively when the content of the polyol compound is more than 8 parts by mass with respect to 100 parts by mass of the acrylic elastomer, the adhesiveness of the acrylic elastomer layer 11 becomes smaller when it is converted to laminate body 1. The content of the polyol compound in the acrylic elastomer composition is preferably 2 to 8 parts by mass with respect to 100 parts by mass of the acrylic elastomer and it is thus possible to improve the adhesion strength and the processability of the acrylic elastomer layer 11 further.

Examples of the polyol compounds added to the acrylic elastomer composition include, but are not particularly limited to, polyhydroxyaromatic compounds such as resorcinol, hydroquinone, 2,2-bis(4-hydroxyphenyl)propane, 2,2-bis(4-hydroxyphenyl)perfluoropropane, 1,7-dihydroxynaphthalene, 2,7-dihydroxynaphthalene, 1,6-dihydroxynaphthalene, 4,4'-dihydroxydiphenyl, 4,4'-dihydroxystilbene, 2,6-dihydroxyanthracene, 2,2-bis(4-hydroxyphenyl)butane, 4,4-bis(4-hydroxyphenyl)valeric acid, 2,2-bis(4-hydroxyphenyl)tetrafluorodichloropropane, 4,4'-dihydroxydiphenylsulfone, 4,4'-dihydroxydiphenylketone, tri(4-hydroxyphenyl)methane, 3,3',5,5'-tetrachlorobisphenol A, and 3,3',5,5'-tetrabromobisphenol A. These polyol compounds can be used alone or in combination of two or more.

<Other Components>

The acrylic elastomer composition for preparation of acrylic elastomer layer 11 may contain, in addition to the components described above, other additives such as crosslinking agents and crosslinking accelerators added thereto. Further, it may contain additionally other additives such as fillers, reinforcing agents, plasticizers, lubricants, aging inhibitors, stabilizers, and silane-coupling agents according to applications when it is used practically.

The crosslinking agent is not particularly limited. Those commonly used in crosslinking acrylic rubber compositions can be used and, in particular, imidazole compounds are favorable. The addition amount of the crosslinking agent is also not particularly limited, but it is desirably 0.1 to 10 parts by mass with respect to 100 parts by mass of the acrylic elastomer and it is thus possible to perform necessary and sufficient crosslinking treatment.

Examples of the imidazole compounds used as crosslinking agents include 1-methylimidazole, 1,2-dimethylimidazole, 1-methyl-2-ethylimidazole, 1-benzyl-2-methylimidazole, 1-benzyl-2-ethylimidazole, 1-benzyl-2-ethyl-5-methylimidazole, 1-benzyl-2-phenylimidazole, 1-benzyl-2-phenylimidazole trimellitate salts, 1-aminoethylimidazole, 1-aminoethyl-2-methylimidazole, 1-aminoethyl-2-ethylimidazole, 1-cyanoethyl-2-methylimidazole, 1-cyanoethyl-2-phenylimidazole, 1-cyanoethyl-2-ethyl-4-methylimidazole, 1-cyanoethyl-2-undecylimidazole, 1-cyanoethyl-2-methylimidazole trimellitate, 1-cyanoethyl-2-phenylimidazole trimellitate, 1-cyanoethyl-2-ethyl-4-methylimidazole trimellitate, 1-cyanoethyl-2-undecyl-imidazole trimellitate, 2,4-diamino-6-[2'-methylimidazolyl-(1)']ethyl-s-triazine isocyanurate adduct, 1-cyanoethyl-2-phenyl-4,5-di-(cyanoethoxymethyl)imidazole, N-(2-methylimidazolyl-1-ethyl)urea, N,N'-bis-(2-methylimidazolyl-1-ethyl)urea, 1-(cyanoethylaminoethyl)-2-methylimidazole, N,N'-[2-methylimidazolyl-(1)-ethyl]-adipoyldiamide, N,N'-[2-methylimiidazolyl-(1)-ethyl]-dodecanedioyldiamide, N,N'-[2-methylimidazolyl-(1)-ethyl]-eicosanedioyldiamide, 2,4-diamino-6-[2'-methylimidazolyl-(1)]-ethyl-s-triazine, 2,4-diamino-6-[2'-undecylimidazolyl-(1)]-ethyl-s-triazine, 1-dodecyl-2-methyl-3-benzylimidazolium chloride, 1,3-dibenzyl-2-methylimidazolium chloride, and the like.

The crosslinking accelerator, which is an agent for regulation of the crosslinking velocity, can be added in an amount that does not impair the advantageous effects of the present invention. It is possible to obtain sufficient effectiveness by addition of it in an amount for example of 0.1 to 5 parts by mass with respect to 100 parts by mass of the acrylic elastomer. The crosslinking accelerators for use are, for example, epoxy resin-curing agents such as thermally degradable ammonium salts, organic acids, acid anhydrides, amines, sulfur, and sulfur compounds.

The filler and the reinforcing agent for use may be any one of those used in common rubber applications, and examples thereof include carbon black, silica, clay, talc, calcium carbonate, and the like. The total amounts of these fillers and reinforcing agents added is desirably 20 to 100 parts by mass with respect to 100 parts by mass of the acrylic elastomer from the viewpoint of the effectiveness of reinforcement of the acrylic elastomer.

Further, the plasticizer for use may be a plasticizer commonly used in rubber applications, and examples thereof include ester-based plasticizers, polyoxyethylene ether-based plasticizers, trimellitate-based plasticizers, and the like. The amount of the plasticizer added is desirably 50 parts by mass or less with respect to 100 parts by mass of the acrylic elastomer for necessary and sufficient effectiveness of plasticization.

<Method for Preparing Acrylic Elastomer Composition>

The acrylic elastomer composition can be prepared by blending the epoxy group-containing acrylic elastomer, the onium salt, and the polyol compound described above in particular amounts and adding, additionally as needed, other components such as crosslinking accelerators and fillers, and kneading the mixture at a temperature not higher than the crosslinking temperature.

The time when the onium salt and the polyol compound are blended is not limited to that when various compounding ingredients are added to the acrylic elastomer, if the compounds are blended before the acrylic elastomer layer 11 and the fluorine-based elastomer layer 12 are bonded by crosslinking. It is thus possible to bond the acrylic elastomer layer 11 to the fluorine-based elastomer layer 12 tightly by crosslinking without any special surface treatment.

The rubber-kneading apparatus used in preparation of the acrylic elastomer composition, i.e., the apparatus used for kneading, molding, and crosslinking the acrylic rubber composition, may be an apparatus commonly used in the rubber industry. Typical examples thereof include rolls, kneaders, Banbury mixers, internal mixers, biaxial extruders, and the like. The acrylic elastomer composition obtained is molded into various desired shapes and laminated on a fluorine-based elastomer layer 12 described below.

[Fluorine-Based Elastomer Layer 12]

The fluorine-based elastomer layer 12 is prepared by molding a fluorine-based elastomer composition containing at least a fluorine-based elastomer and a polyol crosslinking agent into a layer or film shape. The "fluorine-based elastomer composition" is a composition in which 50 mass % or more of the elastomers blended therein is a fluorine-based elastomer. Examples of the elastomers blended with the fluorine-based elastomer include hydrin rubbers, nitrile rubbers, hydrogenated nitrile rubbers, chloroprene rubbers, ethylene-propylene rubbers, silicone rubbers, chlorosulfonated polyethylene rubbers, and the like.

<Fluorine-Based Elastomer>

The fluorine-based elastomer is the major component of the fluorine-based elastomer composition for preparation of the fluorine-based elastomer layer 12. The fluorine-based elastomer may be any elastomer if it contains fluorine atoms and is crosslinkable with polyols. Typical examples thereof include tetrafluoroethylene-ethylene copolymers, tetrafluoroethylene-propylene copolymers, chlorotrifluoroethylene-ethylene copolymers, polyvinylidene fluoride, polyvinyl fluoride, vinylidene fluoride-hexafluoropropylene copolymers, tetrafluoroethylene-vinylidene fluoride-hexafluoropropylene copolymers, tetrafluoroethylene-vinylidene fluoride-perfluoroalkylvinylether copolymers, tetrafluoroethylene-vinylidene fluoride-propylene copolymers, tetrafluoroethylene-vinylidene fluoride-hexafluoropropylene copolymers, and the like.

<Polyol Crosslinking Agent>

The fluorine-based elastomer composition for preparation of the fluorine-based elastomer layer 12 contains a polyol crosslinking agent. The polyol crosslinking agent is a crosslinking agent crosslinking the same or different polymer chains of a fluorine-based elastomer with each other, thus improving the tensile strength and the elasticity of the fluorine-based elastomer by crosslinking. The cross-linked fluorine-based elastomer obtained by crosslinking with the polyol-based crosslinking agent has carbon-oxygen bonds at the crosslinking points and has lower compression set and favorable moldability.

The amount of the polyol crosslinking agent blended then is preferably 0.2 to 10 parts by mass, more preferably 0.5 to 3 parts by mass, and still more preferably 1 to 2.5 parts by mass, with respect to 100 parts by mass of the major-component fluorine-based elastomer. When the amount of the polyol crosslinking agent blended is less than 0.2 part by mass with respect to 100 parts by mass of the fluorine-based elastomer, the effectiveness of the crosslinking of the composition may decline, giving a cross-linked product with insufficient strength. Alternatively when the amount of the polyol crosslinking agent blended is more than 10 parts by mass with respect to 100 parts by mass of the fluorine-based elastomer, the cross-linked product may become excessively hard and lose its rubber elasticity.

The polyol crosslinking agent blended to the fluorine-based elastomer composition may be a polyol compound generally known to be used with fluorine-based elastomers. Among various polyol compounds, polyhydroxy compounds are preferable and polyhydroxyaromatic compounds, which are superior in heat resistance, are particularly preferable.

The kind of the polyhydroxyaromatic compound, when used, is not particularly limited and examples thereof for use include resorcinol, hydroquinone, catechol, 2,2-bis(4-hydroxyphenyl)propane, 2,2-bis(4-hydroxyphenyl)perfluoropropane, 1,7-dihydroxynaphthalene, 2,7-dihydroxynaphthalene, 1,6-dihydroxynaphthalene, 4,4'-dihydroxydiphenyl, 4,4'-dihydroxystilbene, 2,6-dihydroxyanthracene, 2,2-bis(4-hydroxyphenyl)butane, 4,4-bis(4-hydroxyphenyl)valeric acid, 2,2-bis(4-hydroxyphenyl)tetrafluorodichloropropane, 4,4'-dihydroxydiphenylsulfone, 4,4'-dihydroxydiphenylketone, tri(4-hydroxyphenyl)methane, 3,3',5,5'-tetrachlorobisphenol A, 3,3',5,5'-tetrabromobisphenol A, and the like.

Among the compounds above, polyhydroxy compounds are preferable, because the cross-linked fluorine-based elastomer has smaller compression set and is superior in moldability; polyhydroxyaromatic compounds are preferable, because the elastomer is superior in heat resistance; and 2,2-bis(4-hydroxyphenyl)perfluoropropane is more preferable. The polyhydroxyaromatic compound described above may be an alkali metal salt, an alkali-earth metal salt, or the like. If the copolymer of the fluorine-based elastomer is coagulated with an acid, it is preferable not to use a metal salt of polyhydroxyaromatic compound.

The fluorine-based elastomer composition preferably contains a crosslinking accelerator blended together with the polyol crosslinking agent. The crosslinking accelerator, when used, can accelerate formation of intramolecular double bonds by dehydrofluorination reaction of the fluorine-based elastomer main chains and thus the crosslinking reaction. The crosslinking accelerator used with the polyol-based crosslinking agent is preferably a compound that adds to the main chains of the fluorine-based elastomer less easily and an onium compound is used generally.

Examples of the onium compounds blended as crosslinking accelerator include, but are not particularly limited to, ammonium compounds such as quaternary ammonium salts, phosphonium compounds such as quaternary phosphonium salts, oxonium compounds, sulfonium compounds, cyclic amines, monofunctional amine compounds, and the like. Onium salts such as quaternary ammonium salts, quaternary phosphonium salts are preferable among them. When an onium salt is used as crosslinking accelerator, its kind is not particularly limited, and, for example, an onium salt in the kind identical with that of the acrylic elastomer composition described above may be used.

The amount of the crosslinking accelerator added is preferably 0.1 to 2.0 parts by mass, more preferably 0.1 to 1.5 parts by mass, and still more preferably 0.1 to 0.7 parts by mass, with respect to 100 parts by mass of the fluorine-based elastomer. When the amount of the crosslinking accelerator added is less than 0.1 part by mass with respect to 100 parts by mass of the fluorine-based elastomer, it is not possible to obtain the desired action to accelerate the crosslinking velocity. Alternatively when it is more than 2.0 parts by mass, the crosslinking velocity becomes excessively high, leading to scorching (premature crosslinking before crosslinking step) and molding defects.

<Other Components>

The fluorine-based elastomer composition may contain, as needed, various additives such as carbon black, reinforcing agents, softeners, aging inhibitors, crosslinking agents, crosslinking accelerators, fillers, processing aids, plasticizers, colorants, stabilizers, adhesion assistants, acid acceptors, releasing agents, conductivity-enhancing agents, thermal conductivity enhancers, surface-noncohesive agents, flexibility providers, heat resistance improvers, and flame retardants. In addition to the polyol-based crosslinking agent described above, one or more crosslinking agents other than the polyol-based crosslinking agent or one or more crosslinking accelerators may be blended thereto.

<Preparation of Fluorine-Based Elastomer Composition>

The fluorine-based elastomer composition described above is prepared by kneading a fluorine-based elastomer, a polyol crosslinking agent, and, as needed, other compounding ingredients such as crosslinking accelerators and fillers in a commonly-used rubber-kneading apparatus. Examples of the rubber-kneading apparatuses for use include rolls, kneaders, Banbury mixers, internal mixers, biaxial extruders, and the like.

The method of adding the onium salt is not particularly limited, and it is possible to achieve strong crosslink adhesiveness by a method of adding it before the fluorine-based elastomer layer and the acrylic elastomer layer are bonded by crosslinking, for example when the fluorine-based elastomer is kneaded with various compounding ingredients.

As described above in detail, in the laminate body 1 of the present embodiment, the acrylic elastomer and the fluorine-based elastomer becomes co-crosslinkable with each other by addition of the onium salt and thus, the acrylic elastomer layer 11 and the fluorine-based elastomer layer 12 adhere to each other more tightly. As the acrylic elastomer composition for preparation of the laminate body 1 contains a polyol compound having a crosslinking-retarding action, it is also superior in Mooney scorch stability. In addition, the laminate body 1 of the present embodiment does not demand preliminary kneading at high temperature and thus, can be prepared in simpler steps.

Second Embodiment

Hereinafter, a cross-linked product in the second embodiment of the present invention will be described. The cross-linked product in the present embodiment is a product prepared by crosslinking the laminate body 1 of the first embodiment described above. The acrylic elastomer layer 11 and the fluorine-based elastomer layer 12 are desirably bonded by crosslinking, as the elastomers are cross-linked at the interface. Accordingly, the cross-linked product in the present embodiment is prepared as these layers are cross-linked in the state in which they are laminated. It is possible in this way to obtain a laminate body having higher interlayer adhesion strength.

The crosslinking method used then is not particularly limited and may be a common crosslinking method such as press crosslinking, steam crosslinking, or electron beam crosslinking. The crosslinking temperature and the crosslinking period may be determined appropriately according to the blending amounts of respective elastomer compositions and the kind of crosslinking agent, but they are normally 100 to 200° C. and 1 to 10 hours.

One or both of the acrylic elastomer layer 11 and the fluorine-based elastomer layer 12 may be surface-treated before the laminate body 1 is cross-linked. As the acrylic elastomer and the fluorine-based elastomer in the laminate body 1 described above are co-crosslinkable to each other, it is possible to achieve high crosslink adhesiveness even without such surface treatment.

In the cross-linked product of the present embodiment, which is prepared by crosslinking of the laminate body of the first embodiment, the interlayer adhesiveness between the fluorine-based elastomer layer and the acrylic elastomer layer is increased. In particular, the laminate body of the first embodiment described above, which has an acrylic elastomer layer containing an onium salt and a polyol compound added thereto, is superior in interlayer adhesiveness and processing stability. Accordingly, it is possible to integrate multiple elastomer layers without making the production process complicated and produce a cross-linked laminate body tightly bonded.

Third Embodiment

Hereinafter, a molded member in the third embodiment of the present invention will be described. The molded member of the present embodiment, which is, for example, a rubber hose, a seal part such as gasket or packing, or an antivibration rubber part, is prepared from the laminate body of the first embodiment or the cross-linked product of the second embodiment described above.

Examples of the rubber hoses include transmission oil cooler hoses, engine oil cooler hoses, air duct hoses, turbo intercooler hoses, hot air hoses, radiator hoses, power steering hoses, fuel-line hoses, drain-line hoses, and the like, for example, for automobiles, construction machines, and hydraulic machines. These rubber hoses may have a configuration in which fibers or wires for reinforcement are embedded in the hose or placed on the outermost layer of the rubber hose, as is commonly practiced.

Examples of the seal parts include engine head cover gaskets, oil pan gaskets, oil seals, lip seal packings, O-rings, transmission seal gaskets, crank shafts, cam shaft seal gaskets, valve stems, power steering seals, belt cover seals, constant-velocity universal joint boots, rack-and-pinion boots, and the like.

Examples of the antivibration rubber parts include damper-pulleys, center support cushions, suspension bushings, and the like.

The molded member of the present embodiment, which is prepared from the laminate body of the first embodiment or the cross-linked product of the second embodiment, is resistant to deterioration of low-temperature resistance with the acrylic elastomer layer and improved in heat aging resistance with the fluorine-based elastomer layer. It is thus possible to provide a molded member superior in heat aging resistance and low-temperature resistance at low cost.

Examples

Hereinafter, the advantageous effects of the present invention will be described more specifically with reference to Examples and Comparative Examples of the present invention. In the following Examples, laminate bodies of Examples and Comparative Examples were prepared, as the composition of the acrylic elastomer composition was altered, and the interlayer adhesiveness after crosslinking thereof and the Mooney scorch stability of the acrylic elastomer composition were examined.

Specifically, four kinds of acrylic elastomers A to D were first prepared according to the methods and conditions shown below.

<Preparation of Acrylic Elastomer A>

Aqueous 4 mass % partially saponified polyvinylalcohol solution: 17 kg and sodium acetate: 22 g were placed in a reaction container having a capacity of 40 liters.

Previously, the mixture was stirred thoroughly by a stirrer, to give a homogeneous suspension. After the air in the upper region of the tank was substituted with nitrogen, the mixture was continued to be stirred. After the temperature in the tank was kept at 55° C., monomer components (ethyl acrylate: 5.5 kg, n-butyl acrylate: 5.5 kg, and glycidyl methacrylate: 0.15 kg) and aqueous 0.5 mass % t-butyl hydroperoxide solution: 2 kg were added separately through injection ports to initiate polymerization. The reaction was continued for 6 hours, as the temperature in the tank was kept at 55° C. during the reaction, to give a polymerization solution.

Subsequently, aqueous 0.3 mass % sodium borate solution: 20 kg was added to the resulting polymerization solution for precipitation of the polymer, and the polymer was dehydrated and dried, to give an acrylic elastomer A. The acrylic elastomer A had a copolymer composition of glycidyl methacrylate monomer unit: 1.3 parts by mass, ethyl acrylate monomer unit: 50 parts by mass, and n-butyl acrylate monomer unit: 50 parts by mass. The amount of the glycidyl methacrylate monomer was determined quantitatively by dissolving the crude copolymer rubber in chloroform (before crosslinking bonding) and titrating the solution with a perchlorate/acetic acid solution. The amounts of the other monomer unit components were determined by nuclear magnetic resonance spectroscopy method.

<Preparation of Acrylic Elastomer B>

Acrylic elastomer B was prepared by a method under a condition similar to those for the acrylic elastomer A described above, except that the proportions of the monomer components, raw materials for the acrylic elastomer, were changed to vinyl acetate: 2.2 kg, n-butyl acrylate: 8.8 kg, and glycidyl methacrylate: 0.17 kg.

The acrylic elastomer B had a copolymer composition of vinyl acetate monomer unit: 20 parts by mass, n-butyl acrylate monomer unit: 80 parts by mass, and glycidyl methacrylate: 1.5 parts by mass. The amounts of the glycidyl methacrylate monomer and the other monomer unit components of the acrylic elastomer B, and also of the acrylic elastomers C and D below, were determined quantitatively by the method identical with that used for analysis of the acrylic elastomer A.

<Preparation of Acrylic Elastomer C>

Aqueous 4 mass % partially saponified polyvinylalcohol solution: 17 kg and sodium acetate: 22 g were placed in a reaction container having a capacity of 40 liter.

Previously, the mixture was stirred thoroughly by a stirrer, to give a homogeneous suspension. After the air in the upper region of the tank was substituted with nitrogen, ethylene was fed into the tank under pressure and the internal pressure was adjusted to 35 MPa. The mixture was continued to be stirred and after the temperature in the tank was kept at 55° C., monomer components (ethyl acrylate: 5.5 kg, n-butyl acrylate: 5.5 kg, glycidyl methacrylate: 0.15 kg) and aqueous 0.5 mass % t-butyl hydroperoxide solution: 2 kg were added separately through injection ports, to initiate polymerization. The reaction was continued for 6 hours, as the temperature in the tank was kept at 55° C. during the reaction, to give a polymerization solution.

Subsequently, aqueous 0.3 mass % sodium borate solution: 20 kg was added to the resulting polymerization solution for precipitation of the polymer, and the polymer was dehydrated and dried, to give an acrylic elastomer C. The acrylic elastomer C had a copolymer composition of glycidyl methacrylate monomer unit: 1.3 parts by mass, ethyl acrylate monomer unit: 50 parts by mass, n-butyl acrylate monomer unit: 47 parts by mass, and ethylene monomer unit: 3 parts by mass.

<Preparation of Acrylic Elastomer D>

Acrylic elastomer D was prepared by a method under a condition similar to those for the acrylic elastomer A described above, except that the proportions of the monomer components, raw materials for the acrylic elastomer, were changed to ethyl acrylate: 5.5 kg and n-butyl acrylate: 5.5 kg. The acrylic elastomer D had a copolymer composition of ethyl acrylate monomer unit: 50 parts by mass and n-butyl acrylate monomer unit: 50 parts by mass.

<Preparation of Laminate Body>

The fluorine-based elastomer composition (uncross-linked) adjusted to have the composition (mass ratio) shown in the following Table 1 was molded into a sheet shape having a thickness of 2.5 mm, to give a fluorine-based elastomer layer.

TABLE 1

| Component | Composition (mass ratio) |
|---|---|
| Fluorine-based elastomer | 100 |
| Carbon SRF | 13 |
| Magnesium oxide | 3 |
| Calcium hydroxide | 6 |

The acrylic elastomers A to D described above and other materials were kneaded in the compositions (mass ratio) shown in the following Tables 2 to 5 with a 8-inch open roll, to give the acrylic elastomer compositions of Examples 1 to 17 and Comparative Examples 1 to 18. Then, these acrylic elastomer compositions (uncross-linked) were molded into a sheet shape having a thickness of 2.5 mm, to give acrylic elastomer layers respectively. One of these acrylic elastomer layer and the fluorine-based elastomer layer described above were tightly adhered to each other and heat-treated in that state with a steam-heated heat press at 160° C. for 35 minutes, to give the cross-linked product of each laminate body in the Examples and Comparative Examples.

TABLE 2

|  | Example 1 | Example 2 | Example 3 | Example 4 | Example 5 | Example 6 | Example 7 | Example 8 |
|---|---|---|---|---|---|---|---|---|
| Acrylic elastomer A | 100 | 100 | 100 | 100 | 100 | 100 | 100 | 100 |
| Acrylic elastomer B | — | — | — | — | — | — | — | — |
| Acrylic elastomer C | — | — | — | — | — | — | — | — |
| Acrylic elastomer D | — | — | — | — | — | — | — | — |
| Stearic acid | 1 | 1 | 1 | 1 | 1 | 1 | 1 | 1 |
| Aging inhibitor | 1 | 1 | 1 | 1 | 1 | 1 | 1 | 1 |
| Carbon HAF | 55 | 55 | 55 | 55 | 55 | 55 | 55 | 55 |
| Stearyltrimethylammonium bromide | 1 | 2 | 2 | 2 | 2 | 2 | 2 | 2 |
| Tetra-n-butylammonium thiocyanate | — | — | — | — | — | — | — | — |
| Tetra-n-butylammonium chloride | — | — | — | — | — | — | — | — |
| Tetra-n-butylphosphonium bromide | — | — | — | — | — | — | — | — |

TABLE 2-continued

|  | Example 1 | Example 2 | Example 3 | Example 4 | Example 5 | Example 6 | Example 7 | Example 8 |
|---|---|---|---|---|---|---|---|---|
| Methyltriphenylphosphonium bromide | — | — | — | — | — | — | — | — |
| Ethyltriphenylphosphonium bromide | — | — | — | — | — | — | — | — |
| Resorcinol | 1 | 1 | 2 | 4 | 6 | 8 | — | — |
| Hydroquinone | — | — | — | — | — | — | 2 | 5 |
| Curing condition | 160° C. 35 minutes | 160° C. 35 minutes | 160° C. 35 minutes | 160° C. 35 minutes | 160° C. 35 minutes | 160° C. 35 minutes | 160° C. 35 minutes | 160° C. 35 minutes |
| Adhesiveness test result   Separation | ◯ | ◯ | ◯ | ◯ | ◯ | ◯ | ◯ | ◯ |
| Mooney scorch stability   t5 [minute] | 12.4 | 10.6 | 13.0 | 15.0 | 14.3 | 17.1 | 13.0 | 16.3 |

TABLE 3

|  | Example 9 | Example 10 | Example 11 | Example 12 | Example 13 | Example 14 | Example 15 | Example 16 | Example 17 |
|---|---|---|---|---|---|---|---|---|---|
| Acrylic elastomer A | 100 | 100 | 100 | 100 | 100 | — | — | — | — |
| Acrylic elastomer B | — | — | — | — | — | 100 | 100 | — | — |
| Acrylic elastomer C | — | — | — | — | — | — | — | 100 | 100 |
| Acrylic elastomer D | — | — | — | — | — | — | — | — | — |
| Stearic acid | 1 | 1 | 1 | 1 | 1 | 1 | 1 | 1 | 1 |
| Aging inhibitor | 1 | 1 | 1 | 1 | 1 | 1 | 1 | 1 | 1 |
| Carbon HAF | 55 | 55 | 55 | 55 | 55 | 55 | 55 | 55 | 55 |
| Stearyltrimethylammonium bromide | — | — | — | — | — | 2 | 2 | 2 | 2 |
| Tetra-n-butylammonium thiocyanate | 2 | — | — | — | — | — | — | — | — |
| Tetra-n-butylammonium chloride | — | 2 | — | — | — | — | — | — | — |
| Tetra-n-butylphosphonium bromide | — | — | 2 | — | — | — | — | — | — |
| Methyltriphenylphosphonium bromide | — | — | — | 2 | — | — | — | — | — |
| Ethyltriphenylphosphonium bromide | — | — | — | — | 2 | — | — | — | — |
| Resorcinol | 2 | 2 | 2 | 2 | 2 | 2 | — | 2 | — |
| Hydroquinone | — | — | — | — | — | — | 2 | — | 2 |
| Curing condition | 160° C. 35 minutes | 160° C. 35 minutes | 160° C. 35 minutes | 160° C. 35 minutes | 160° C. 35 minutes | 160° C. 35 minutes | 160° C. 35 minutes | 160° C. 35 minutes | 160° C. 35 minutes |
| Adhesiveness test result   Separation | ◯ | ◯ | ◯ | ◯ | ◯ | ◯ | ◯ | ◯ | ◯ |
| Mooney scorch stability   t5 [minute] | 16.7 | 13.9 | 10.2 | 11.5 | 10.5 | 19.0 | 17.4 | 12.0 | 13.5 |

TABLE 4

|  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|
| Acrylic elastomer A | 100 | 100 | 100 | 100 | 100 | 100 | 100 | 100 | 100 |
| Acrylic elastomer B | — | — | — | — | — | — | — | — | — |
| Acrylic elastomer C | — | — | — | — | — | — | — | — | — |
| Acrylic elastomer D | — | — | — | — | — | — | — | — | — |
| Stearic acid | 1 | 1 | 1 | 1 | 1 | 1 | 1 | 1 | 1 |
| Aging inhibitor | 1 | 1 | 1 | 1 | 1 | 1 | 1 | 1 | 1 |
| Carbon HAF | 55 | 55 | 55 | 55 | 55 | 55 | 55 | 55 | 55 |
| Stearyltrimethylammonium bromide | 0.5 | 1 | 2 | 4 | 6 | 7 | 0.5 | 1 | 7 |
| Tetra-n-butylammonium thiocyanate | — | — | — | — | — | — | — | — | — |
| Tetra-n-butylammonium chloride | — | — | — | — | — | — | — | — | — |
| Tetra-n-butylphosphonium bromide | — | — | — | — | — | — | — | — | — |
| Methyltriphenylphosphonium bromide | — | — | — | — | — | — | — | — | — |
| Ethyltriphenylphosphonium bromide | — | — | — | — | — | — | — | — | — |
| Resorcinol | — | — | — | — | — | — | 10 | 10 | 10 |
| Hydroquinone | — | — | — | — | — | — | — | — | — |

TABLE 4-continued

|  |  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|
| Curing condition | | 160° C. 35 minutes | 160° C. 35 minutes | 160° C. 35 minutes | 160° C. 35 minutes | 160° C. 35 minutes | 160° C. 35 minutes | 160° C. 35 minutes | 160° C. 35 minutes | 160° C. 35 minutes |
| Adhesiveness test result | Separation | | Δ | ○ | ○ | ○ | ○ | | | |
| Mooney scorch stability | t5 [minute] | 21.1 | 9.4 | 3.1 | 3.3 | 3.5 | 2.5 | 25.3 | 20.9 | 13.8 |

TABLE 5

|  |  | Comparative Example 10 | Comparative Example 11 | Comparative Example 12 | Comparative Example 13 | Comparative Example 14 | Comparative Example 15 | Comparative Example 16 | Comparative Example 17 | Comparative Example 18 |
|---|---|---|---|---|---|---|---|---|---|---|
| Acrylic elastomer A | | 100 | 100 | 100 | 100 | 100 | 100 | 100 | — | — |
| Acrylic elastomer B | | — | — | — | — | — | — | — | 100 | — |
| Acrylic elastomer C | | — | — | — | — | — | — | — | — | — |
| Acrylic elastomer D | | — | — | — | — | — | — | — | — | 100 |
| Stearic acid | | 1 | 1 | 1 | 1 | 1 | 1 | 1 | 1 | 1 |
| Aging inhibitor | | 1 | 1 | 1 | 1 | 1 | 1 | 1 | 1 | 1 |
| Carbon HAF | | 55 | 55 | 55 | 55 | 55 | 55 | 55 | 55 | 55 |
| Stearyltrimethylammonium bromide | | — | 7 | — | — | — | — | — | 2 | 2 |
| Tetra-n-butylammonium thiocyanate | | — | — | 2 | — | — | — | — | — | — |
| Tetra-n-butylammonium chloride | | — | — | — | 2 | — | — | — | — | — |
| Tetra-n-butylphosphonium bromide | | — | — | — | — | 2 | — | — | — | — |
| Methyltriphenylphosphonium bromide | | — | — | — | — | — | 2 | — | — | — |
| Ethyltriphenylphosphonium bromide | | — | — | — | — | — | — | 2 | — | — |
| Resorcinol | | 5 | 5 | — | — | — | — | — | — | 2 |
| Hydroquinone | | — | — | — | — | — | — | — | — | — |
| Curing condition | | 160° C. 35 minutes | 160° C. 35 minutes | 160° C. 35 minutes | 160° C. 35 minutes | 160° C. 35 minutes | 160° C. 35 minutes | 160° C. 35 minutes | 160° C. 35 minutes | 160° C. 35 minutes |
| Adhesiveness test result | Separation | | ○ | ○ | ○ | ○ | ○ | ○ | ○ | |
| Mooney scorch stability | t5 [minute] | uncured | 5.2 | 6.5 | 8.4 | 4.4 | 5.5 | 5.8 | 2.7 | uncured |

The reagents used in the Examples and Comparative Examples shown in Tables 1 to above are the followings:
  Fluorine-based elastomer: DAI-EL G558 (manufactured by Daikin Industries, Ltd., containing a polyol cross-linking agent in the product)
  Magnesium oxide: Kyowa mag 150 (manufactured by Kyowa Chemical Industry Co., Ltd.)
  Calcium hydroxide: analytical grade (manufactured by Wako Pure Chemical Industries, Ltd.)
  Carbon SRF: Asahi #50 (manufactured by Asahi Carbon Co., Ltd.)
  Carbon HAF: Seast #3 (manufactured by Tokai Carbon Co., Ltd.)
  Aging inhibitor: Nocrac CD (manufactured by Ouchi Shinko Chemical Industrial Co., Ltd.)
  Stearic acid: Lunac S-90 (manufactured by Kao Corp.)
  Stearyltrimethylammonium bromide: analytical grade (manufactured by Wako Pure Chemical Industries, Ltd.)
  Tetra-n-butylammonium thiocyanate: analytical grade (manufactured by Wako Pure Chemical Industries, Ltd.)
  Tetra-n-butylammonium chloride: analytical grade (manufactured by Wako Pure Chemical Industries, Ltd.)
  Tetra-n-butylphosphonium bromide: analytical grade (manufactured by Wako Pure Chemical Industries, Ltd.)
  Methyltriphenylphosphonium bromide: analytical grade (manufactured by Wako Pure Chemical Industries, Ltd.)
  Ethyltriphenylphosphonium bromide: analytical grade (manufactured by Wako Pure Chemical Industries, Ltd.)
  Hydroquinone: analytical grade (manufactured by Wako Pure Chemical Industries, Ltd.)
  Resorcinol: analytical grade (manufactured by Wako Pure Chemical Industries, Ltd.)

Subsequently, the Mooney scorch stability of the acrylic resin compositions of Examples and Comparative Examples and the interlayer adhesiveness (peeling strength) of the cross-linked product of each laminate body (test specimen) were determined by the methods shown below.

(Interlayer Adhesiveness)

The interlayer adhesiveness was evaluated based on the peeling strength, which was determined by performing a 180° peel test using a tensile tester at a peeling velocity of 50 mm/minute. In addition, separation of each test specimen was observed and indicated by ○ when the specimen showed material failure, by Δ when it showed partial material failure, and by when the layer was separated at the interface.

(Mooney Scorch Stability)

The Mooney scorch time (t5) of each of the acrylic elastomer compositions of Examples and Comparative Examples was determined according to JIS K6300 under a test condition at 125° C. The acrylic elastomer composition is higher in Mooney scorch stability when the Mooney scorch time (t5) is larger. The fluorine-based elastomer compositions, when in the composition shown in Table 1, had a Mooney scorch time (t5) of about 10 minutes and caused no problem in processing stability and thus, in the present Example, only acrylic elastomer compositions, of which the processing stability may be reduced by addition of the onium salt, were evaluated.

The results above are summarized in Tables 2 to 5. As obvious from Tables 2 to 5 above, the laminate bodies of Examples 1 to 17, which were prepared within the scope of the present invention, gave cross-linked products higher in the interlayer adhesion strength between the fluorine-based elastomer layer and the acrylic elastomer layer even without special surface treatment. In addition, the acrylic elastomer compositions of Examples 1 to 17 were also superior in Mooney scorch stability.

As obvious when Examples 1 to 8 and Examples 9 to 12 were compared, it was possible to obtain cross-linked laminate body superior in interlayer adhesiveness, independently of the kind of the onium salt used, even if any onium salt, an organic ammonium or phosphonium salt, was used. Further as obvious when Examples 1 to 16 and Comparative Examples 1 to 10 are compared, the Mooney scorch stability was shown to be increased by addition of a polyol compound.

On the other hand in Comparative Examples 1, 7, 8, and 9, the Mooney scorch stability was favorable, but the adhesiveness was lower than that in Examples 1 to 8. Also in Comparative Examples 2 to 6 and 11 to 17, the adhesiveness was favorable, but the Mooney scorch stability was unsatisfactory. As shown above, lower Mooney scorch stability causes a concern about processing failure, making it difficult to produce the laminate body.

These results indicate that it is possible according to the present invention to provide a laminate body, a cross-linked product, and a molded member superior in interlayer adhesiveness.

Although a few embodiments of the present invention have been shown and described, it would be appreciated by those skilled in the art that changes may be made in this embodiment without departing from the principles and spirit of the invention, the scope of which is defined in the claims and their equivalents.

REFERENCE SIGNS LIST

1: laminate body
11: acrylic elastomer layer
12: fluorine-based elastomer layer

The invention claimed is:

1. A laminate body, comprising:
   an acrylic elastomer layer prepared from an acrylic elastomer composition containing an epoxy group-containing acrylic elastomer as major component, an onium salt in an amount of 1 to 5 parts by mass and a polyol compound in an amount of 1 to 8 parts by mass with respect to 100 parts by mass of the acrylic elastomer; and a fluorine-based elastomer layer prepared from a fluorine-based elastomer composition containing a polyol crosslinking agent
   wherein the epoxy group-containing acrylic elastomer is a copolymer of an alkyl(meth)acrylate ester and an epoxy group-containing crosslinking monomer,
   the epoxy group-containing crosslinking monomer is optionally copolymerized to one or more other crosslinking monomers,
   the epoxy group-containing crosslinking monomer is copolymerized in an amount of 0.5 to 10 mass % with respect to the total amount of the monomers constituting the acrylic elastomer,
   the onium salt and the polyol compound are blended into the acrylic elastomer before the acrylic elastomer layer and the fluorine-based elastomer layer are bonded by crosslinking,
   the Mooney scorch time (t5) of the acrylic elastomer composition is 10 minutes or more according to JIS K6300 under a test condition at 125° C.,
   the acrylic elastomer layer and the fluorine-based elastomer layer are crosslinked, and
   the polyol compound in the acrylic elastomer composition is one or more polyhydroxyaromatic compounds.

2. The laminate body according to claim 1, wherein the onium salt is an organic ammonium salt and/or an organic phosphonium salt.

3. A cross-linked product, prepared by crosslinking the laminate body according to claim 1.

4. A molded member of the cross-linked product according to claim 3.

5. The molded member according to claim 4, for use as a hose, a seal part, or an antivibration rubber part.

6. A molded member of the laminate body according to claim 1.

7. The molded member according to claim 6, for use as a hose, a seal part, or an antivibration rubber part.

8. A cross-linked product, prepared by crosslinking the laminate body according to claim 2.

* * * * *